United States Patent
Trim et al.

(10) Patent No.: US 11,044,328 B2
(45) Date of Patent: Jun. 22, 2021

(54) CONTROLLING CONTENT DELIVERY

(71) Applicant: INTERNATIONAL BUSINESS MACHINES CORPORATION, Armonk, NY (US)

(72) Inventors: Craig M. Trim, Ventura, CA (US); Kimberly Greene Starks, Nashville, TN (US); Michael E. Alexander, Great Falls, VA (US); Gandhi Sivakumar, Bentleigh (AU); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 16/202,570

(22) Filed: Nov. 28, 2018

(65) Prior Publication Data

US 2020/0169615 A1    May 28, 2020

(51) Int. Cl.
*H04L 29/08* (2006.01)
*H04L 29/06* (2006.01)
(Continued)

(52) U.S. Cl.
CPC ........ *H04L 67/18* (2013.01); *G06F 16/24568* (2019.01); *G06F 16/258* (2019.01);
(Continued)

(58) Field of Classification Search
CPC .............. H04L 67/18; H04L 65/4069; G06F 16/24568; G06F 16/258; G06F 16/29; G06N 5/022
See application file for complete search history.

(56) References Cited

U.S. PATENT DOCUMENTS 8,201,080 B2 * 6/2012 Basson .............. H04N 21/4348
                                                    715/230
10,044,655 B2    8/2018 Martell
(Continued)

FOREIGN PATENT DOCUMENTS

CN    108156469 A    6/2018
WO    2016109131 A1    7/2016

OTHER PUBLICATIONS

IBM Watson—Speech to Text; https://www.ibm.com/watson/developercloud/speech-to-text.html; retrieved from the Internet Sep. 5, 2018; 6 pages.
(Continued)

*Primary Examiner* — John A Follansbee
*Assistant Examiner* — Raqiul A Choudhury
(74) *Attorney, Agent, or Firm* — Schmeiser, Olsen & Watts; Brian M. Restauro (57) ABSTRACT

An approach is provided for controlling content delivery. Stream data and associated metadata are received from one or more sources. The stream data is converted into a text format. The converted stream data is processed in an artificial intelligence system to detect emotions of the stream data. The emotions of the stream data are mapped to a set of rules for a geographic area. Unacceptable content in the stream data is identified based on the emotions and the set of rules for the geographic area. Content delivery servers are notified to discard the unacceptable content so that the unacceptable content is not delivered through content distribution channels and is not viewed by an end user.

14 Claims, 3 Drawing Sheets

(51) Int. Cl.
*G06N 5/02* (2006.01)
*G06F 16/25* (2019.01)
*G06F 16/2455* (2019.01)
*G06F 16/29* (2019.01)

(52) U.S. Cl.
CPC ............ *G06F 16/29* (2019.01); *G06N 5/022* (2013.01); *H04L 65/4069* (2013.01)

(56) References Cited

U.S. PATENT DOCUMENTS

| | | | |
|---|---|---|---|
| 10,045,080 B2 | 8/2018 | Nandi | |
| 2004/0125877 A1* | 7/2004 | Chang | G06K 9/00335 375/240.28 |
| 2008/0147873 A1* | 6/2008 | Matsumoto | G06F 16/958 709/231 |
| 2008/0242280 A1* | 10/2008 | Shapiro | H04N 21/41407 455/414.3 |
| 2010/0011392 A1* | 1/2010 | Bronstein | H04N 21/4756 725/28 |
| 2010/0331023 A1 | 12/2010 | Cai | |
| 2012/0246732 A1 | 9/2012 | Burton | |
| 2013/0246440 A1* | 9/2013 | Tareen | G06Q 10/00 707/749 |
| 2013/0326406 A1* | 12/2013 | Reiley | G06F 3/048 715/810 |
| 2014/0222830 A1* | 8/2014 | Ringer | G06F 16/487 707/748 |
| 2015/0271230 A1* | 9/2015 | Bostick | H04L 67/2823 715/738 |
| 2015/0356442 A1 | 12/2015 | Chawla | |
| 2017/0019446 A1 | 1/2017 | Son | |
| 2017/0154314 A1* | 6/2017 | Mones | G06N 20/00 |
| 2017/0295215 A1* | 10/2017 | Syed | H04L 65/4069 |
| 2018/0376534 A1* | 12/2018 | Mustafic | H04L 9/0631 |
| 2019/0075331 A1* | 3/2019 | Coburn, IV | H04L 65/4092 |
| 2019/0124023 A1* | 4/2019 | Conroy | H04L 51/32 |

OTHER PUBLICATIONS

Wikipedia; Content delivery network; https://en.wikipedia.org/wiki/Content_delivery_network; retrieved from the Internet Sep. 5, 2018; 9 pages.

* cited by examiner

CONTROLLING CONTENT DELIVERY

BACKGROUND

The present invention relates to content delivery, and more particularly to efficient, computer-based control of the delivery of content.

Advancements in the telecommunication industry has enabled technologies such as artificial intelligence (AI) to succeed by breaking the barrier of various factors including sedentary operations, lower bandwidth, etc. 4G telecommunication technology has pushed such technologies to an upper stratum by parallelizing the physical channel, which results in higher bandwidth. The 5G telecommunication technology is expected to serve as a rich enabler to push the dependent technologies to even higher levels through a mobility bandwidth of 1 gigabit per second (Gbps), convergence of Internet of Things (IoT) device access, etc. One of the key features of the 5G technology is the network itself being intelligent and cognitive. Thus, the 5G network is expected to become a part of the human community through various features including observing the surroundings, reasoning, inferring, and making decisions like humans.

SUMMARY

In one embodiment, the present invention provides a computer-implemented method of controlling content delivery. The method includes receiving, by one or more processors, stream data and metadata associated with the stream data from one or more sources. The method further includes converting, by the one or more processors, the stream data into a text format. The method further includes processing, by the one or more processors, the converted stream data in an artificial intelligence (AI) system to detect emotions of the stream data. The method further includes mapping, by the one or more processors, the emotions of the stream data to a set of rules for a geographic area. The method further includes identifying, by the one or more processors, unacceptable content in the stream data based on the emotions and the set of rules for the geographic area. The method further includes notifying, by the one or more processors, content delivery servers to discard the unacceptable content so that the unacceptable content is not delivered through content distribution channels and is not viewed by an end user.

In another embodiment, the present invention provides a computer program product for controlling content delivery. The computer program product includes a computer readable storage medium having computer readable program code stored on the computer readable storage medium. The computer readable storage medium is not a transitory signal per se. The computer readable program code is executed by a central processing unit (CPU) of a computer system to cause the computer system to perform a method. The method includes the computer system receiving stream data and metadata associated with the stream data from one or more sources. The method further includes the computer system converting the stream data into a text format. The method further includes the computer system processing the converted stream data in an artificial intelligence (AI) system to detect emotions of the stream data. The method further includes the computer system mapping the emotions of the stream data to a set of rules for a geographic area. The method further includes the computer system identifying unacceptable content in the stream data based on the emotions and the set of rules for the geographic area. The method further includes the computer system notifying content delivery servers to discard the unacceptable content so that the unacceptable content is not delivered through content distribution channels and is not viewed by an end user.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of controlling content delivery. The method includes the computer system receiving stream data and metadata associated with the stream data from one or more sources. The method further includes the computer system converting the stream data into a text format. The method further includes the computer system processing the converted stream data in an artificial intelligence (AI) system to detect emotions of the stream data. The method further includes the computer system mapping the emotions of the stream data to a set of rules for a geographic area. The method further includes the computer system identifying unacceptable content in the stream data based on the emotions and the set of rules for the geographic area. The method further includes the computer system notifying content delivery servers to discard the unacceptable content so that the unacceptable content is not delivered through content distribution channels and is not viewed by an end user.

DETAILED DESCRIPTION

Overview

Conventional delivery of content from multiple channels includes delivering content (e.g., news content) from one channel that may include a description of a current tragic, disastrous or otherwise unfortunate event while also delivering other content (e.g., media content) through other channels whose substance and/or emotional tone conflicts with the description of the current unfortunate event, thereby making the delivery of the other content unacceptable at the current time. The delivery of the unacceptable content can cause a public outcry, lawsuits, and/or declining viewership of the content, thereby causing the service provider or entity responsible for streaming the content to increase costs and/or lose revenue.

Embodiments of the present invention address the aforementioned unique challenges of content management by providing an enhanced content delivery apparatus working in the service orchestration layer in a 5G telecom network and using smart channel monitoring tools. The enhanced content delivery apparatus provides an efficient control of the delivery of content by observing and inferring the real-time content (e.g., real-time media content, such as news content) captured at the head end of a content delivery network, converting content being delivered by media channels into a textual format for processing, analyzing the converted content to identify insights in the converted content and identify unacceptable content (i.e., unacceptable given the nature of the content, the location at which the content is being received, the current time, and the current situation inferred from the real-time content), and communicating with a service provider to request a deferral of delivery of the unacceptable content or automatically defer the delivery of the unacceptable content when operated in Network Operations Center (NOC) mode. For example, the aforementioned control of the delivery of content includes a control of the delivery of media content.

In one embodiment, the enhanced content delivery apparatus collects information related to local culture and history, so that identifying the impact of content captured at the head end of content delivery network (e.g., news) and determining other content for deferral based on the impact of the content are improved over time by learning from the local culture and history. In one embodiment, the identification of the unacceptable content and the deferral of the delivery of the unacceptable content provides an efficient way for content broadcast systems to provide social awareness to content distribution channels. In one embodiment, the enhanced content delivery apparatus communicates with the content delivery server, fetches and analyzes the content stream (e.g., media stream), related metadata, and the stream delivery schedule, and generates an alert if some of the ongoing streaming content or content scheduled to be streamed is not suitable based on the current situation, the nature of the content, and the current time or the time of the scheduled streaming, where the alert is a notification to the content delivery servers to request a deferral of the delivery of the content or a discarding of the content.

In one embodiment, the enhanced content delivery apparatus enables service providers (e.g., service providers providing Infrastructure as a Service or Platform as a Service) to provide more accurate and optimal real-time data placement using 5G service orchestration and the ability to push the data based on realistic situations by self-adjusting the monitoring levels based on real-time information utilization.

System for Controlling Content Delivery

Figure 1:
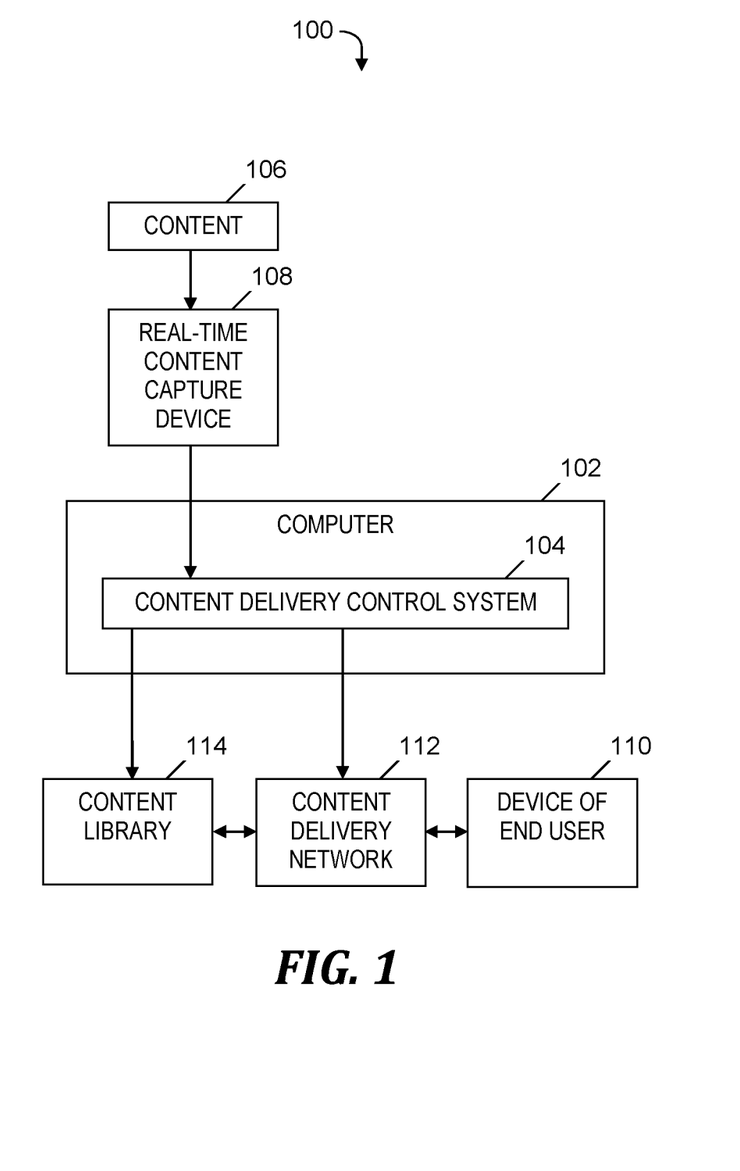
FIG. 1 is a block diagram of a system for controlling content delivery, in accordance with embodiments of the present invention.

FIG. 1 is a block diagram of a system 100 for controlling content delivery, in accordance with embodiments of the present invention. System 100 includes a computer 102 which executes software-based content delivery control system 104. Content 106 from a channel (not shown) is captured in real-time by a real-time content capture device 108 prior to content 106 being delivered to an end user. In one embodiment, real-time content capture device 108 is a head end device. In one embodiment, content 106 is news content originating from a news streaming service. Content delivery control system 104 identifies insights of content 106 by converting content 106 to textual content, analyzing the converted content 106 to determine information insights including an emotion associated with content 106, detecting unacceptable content delivered on other channels based on the identified insights, and either communicating with service providers to request a deferral of a delivery of the unacceptable content to an end user or automatically deferring the delivery of the unacceptable content to the end user. In one embodiment, content delivery control system 104 automatically defers the delivery of the unacceptable contents in response to the content delivery control system 104 being operated in a NOC mode.

As used herein, unacceptable content is defined as content whose emotions (i.e., emotional tone of the content) conflict with the emotions of other content that is being captured in real-time. Acceptable content is defined as content whose emotions do not conflict with emotions of the other content that is being captured in real-time. A first emotion of first content conflicts with a second emotion of second content being captured in real-time based on the first and second emotions being mapped to a rule or set of rules for a geographic area, where the rule(s) indicate that first content being delivered to an end user located in the geographic area runs counter to customs and cultural and social conventions of people in the geographic area when (i) the first content has the first emotion, (ii) the second content has the second emotion because the second content describes an event (e.g., a tragic event or other unfortunate incident) that is associated with the second emotion, and (iii) the first content is (a) delivered within a time period during which the event described in the first content is occurring or (b) is scheduled to be delivered at a future time that is within a preconfigured time period associated with the event described in the first content. For example, in geographic area A, the local customs and conventions indicate that Content X, which is a comedy provided for entertainment purposes only and that has the emotional tone of amusement, is not acceptable content to be viewed by end user E located in geographic area A because people in geographic area A are aware of an ongoing tragic event T described in news Content Y that is being captured in real-time and that has the emotional tone of sorrow. In this example, a rule specifies that the emotion of amusement in a first content conflicts with the emotion of sorrow in a second content.

The aforementioned event described in the content captured in real-time is also referred to herein as the current situation. The emotion of content is also referred to herein as the nature of the content.

In one embodiment, content delivery control system 104 uses a natural language classification module (not shown) or other techniques provided by an AI system to review content that has been converted to a text format and identify emotion(s) associated with the converted content.

Content delivery control system 104 collects the information related to the local culture and the impact of the content captured in real-time, determines contents which are candidates for deferred delivery or discarding based on the impact of the content captured in real-time, learns from the local culture and history, and provides an efficient way for content broadcast systems to provide and promote social awareness via the content distribution channels.

A device 110 of an end user sends a request for other content via a content delivery network 112, where the requested content is stored in a content library 114. Content delivery network 112 ingests the requested content sent from content library 114 and streams the requested content to the device 110 of the end user. Content delivery network 112 includes multiple servers which are responsible for providing contents from content library 114 to end users in response to devices of the end users requesting the contents. A 5G network (not shown) is connected to content delivery network 112 via a media gateway which interlinks content delivery network 112 and the 5G network to reach the end user. Content delivery network 112 also observes and infers the real-time content (e.g., broadcast news) captured by real-time content capture device 108. Content delivery control system 104 communicates with servers in content delivery network 112 and fetches and analyzes the content stream, related metadata, and a stream delivery schedule, and sends an alert if content currently being streamed or content that is scheduled to be streamed is not suitable (i.e., unacceptable) based on the current time or scheduled time for streaming the content, the nature of the content being streamed, the location at which the content is being or will be received, and the current situation in the location as determined by the content captured in real-time, where the alert notifies the servers in content delivery network 112 to defer or discard the unsuitable content so that the unsuitable content is not delivered to device 110 and viewed by the end user.

In one embodiment, content delivery control system 104 runs in a service orchestration layer of a 5G network and includes the following components: Speech to Text, Boundary Extractor, Boundary Map coordinate identifier, Classifier, Content Delivery Search, Content Metadata map compare, Notifier, Auto-delivery Manager, and Incident Cycle Manager. The Speech to Text component converts a broadcast channel's audio feed to text and sends the text to the Classifier component, which includes a hierarchical or parallel natural language classification module. The Boundary Extractor and Boundary Map coordinate identifier components determine a scope boundary definition for content (e.g., news content that is relevant to a particular city, state, or country) and determine coordinates of the scope boundary (i.e., coordinates of a geographic area for which the content is relevant). The Classifier component receives the scope boundary and provides boundary map-based classification. For example, the Classifier component classifies news content as tragic if the content is being received in a geographic area within the scope boundary.

In one embodiment, the Content Delivery Search component reviews all content delivery edge servers (either real-time or content-based delivery) that serve within the scope boundary and identify the type of content being delivered to the end users.

In one embodiment, the Content Metadata map compare component performs a metadata match of the real-time content classification with the entities and content metadata. For example, the metadata match reveals that certain channels are delivering content that is entertainment, which is determined to be not socially or culturally acceptable because the entertainment content is being delivered to an area which is experiencing a tragic situation. Furthermore, the metadata match identifies streams whose content is not classified as entertainment and the Notifier component notifies the service provider to switch from the entertainment content to the non-entertainment content. Alternatively, the Auto-delivery Manager component uses a content metadata map with real-time captured entities and classifications to automatically switch the delivery of the content from the entertainment content to the non-entertainment content.

In one embodiment, the Incident Cycle Manager component monitors the cycle of an event (e.g., news event) and advises the service provider to switch to acceptable content (e.g., content whose emotional tone matches the emotional tone of the event) while the cycle of the event is ongoing and to switch back to normal content delivery after the event has completed its cycle.

Figure 2:
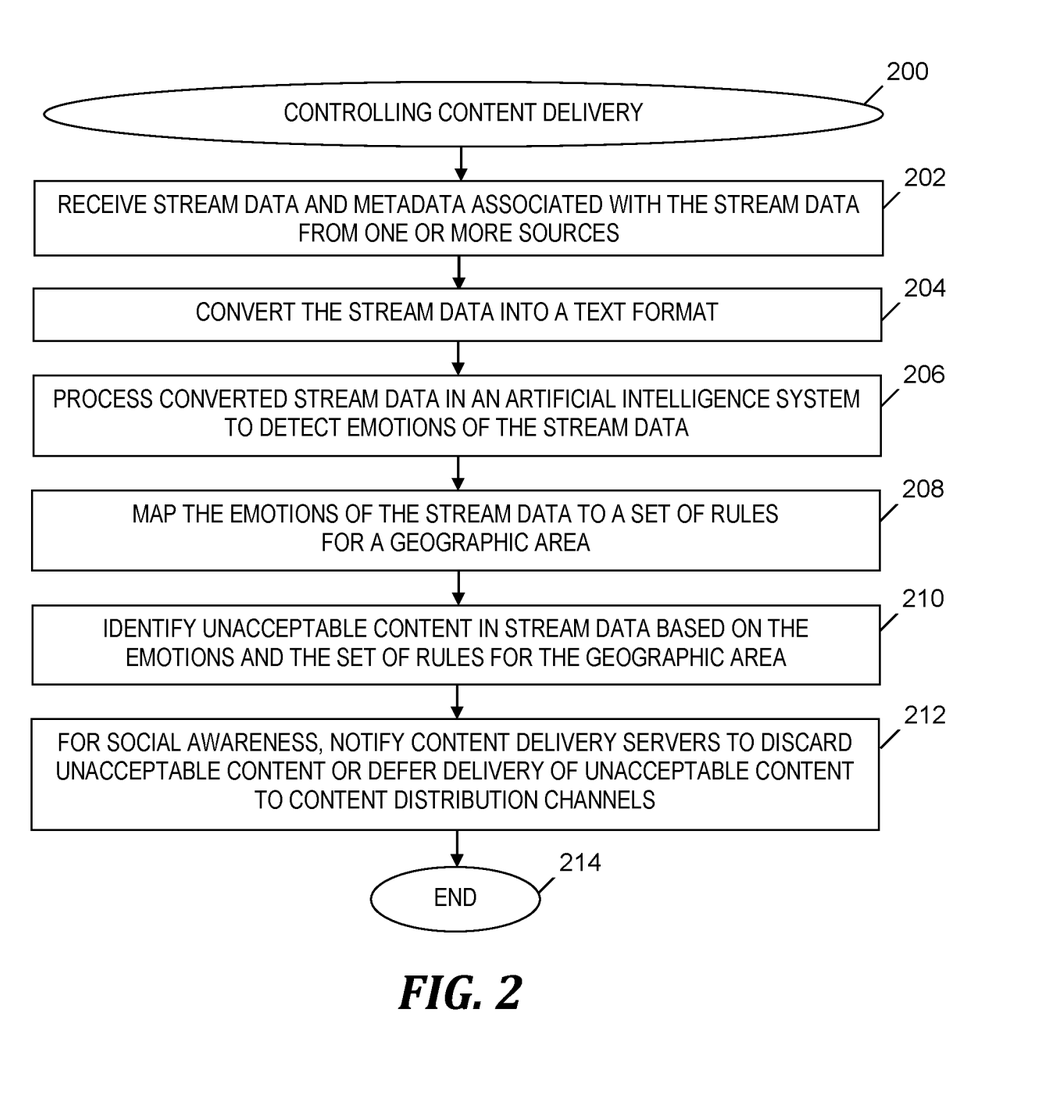
FIG. 2 is a flowchart of a process of controlling content delivery, where the process is implemented in the system of FIG. 1, in accordance with embodiments of the present invention.
Figure 3:
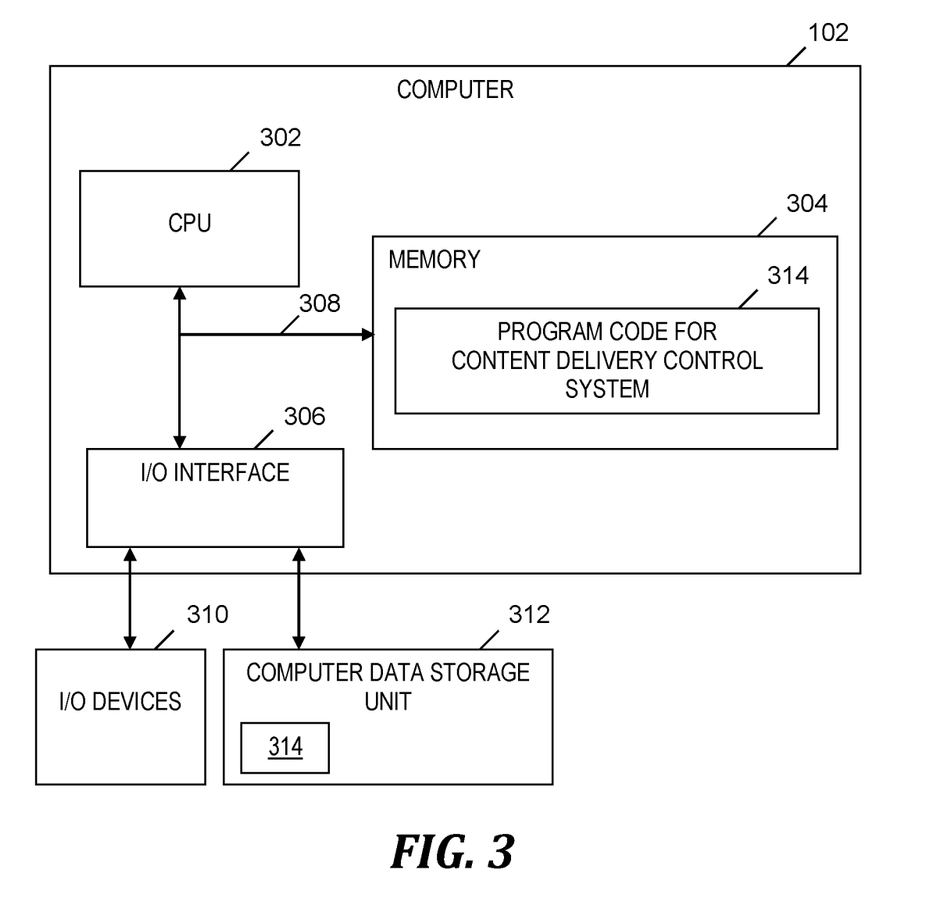
FIG. 3 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Controlling Content Delivery

FIG. 2 is a flowchart of a process of controlling content delivery, where the process is implemented in the system of FIG. 1, in accordance with embodiments of the present invention. The process of FIG. 2 starts at step 200. In step 202, content delivery control system 104 (see FIG. 1) receives stream data and metadata associated with the stream data from one or more sources. In one embodiment, the stream data includes content 106 (see FIG. 1) and other content requested by the device 110 (see FIG. 1) of the end user. Content 106 (see FIG. 1) includes text, audio, and/or video data. For example, content delivery control system 104 (see FIG. 1) captures in real-time news content being delivered to end users. In one embodiment, content delivery control system 104 (see FIG. 1) communicates with content delivery servers in the content delivery network 112 (see FIG. 1) to fetch the content stream together with delivery metadata. In one embodiment, content delivery control system 104 (see FIG. 1) identifies the start and end of content and generates metadata specifying the identified start and end. In one embodiment, step 202 includes content delivery control system 104 (see FIG. 1) capturing stream data at a head end of content delivery network 112 (see FIG. 1).

In one embodiment, content delivery control system 104 (see FIG. 1) identifies a set of people affected by the captured content (e.g., news content) and geographic area(s) affected by the content. Content delivery control system 104 (see FIG. 1) uses control policies to relate the content to the set of people affected and the geographic area(s) affected.

In one embodiment, content delivery control system 104 (see FIG. 1) integrates and utilizes expression maps, and phrases and gestures used in the content to determine a type of the content and generates metadata accordingly.

In step 204, content delivery control system 104 (see FIG. 1) converts the stream data received in step 202 into a text format. In one embodiment, a Speech to Text component of the content delivery control system 104 (see FIG. 1) converts the stream data into the text format.

In step 206, content delivery control system 104 (see FIG. 1) processes the converted stream data (i.e., the stream data converted into text format resulting from step 204) and the received metadata in an AI system, which includes detecting emotions (i.e., an emotional tone) of the contents in the stream data. The AI system provides a cognitive assessment of the stream data by classifying, training, and extracting entities of the stream data to determine the emotions of the contents in the stream data. In one embodiment, content delivery control system 104 (see FIG. 1) detects the content being delivered by other channels and generates the rules for the content pulled from the stream data.

In step 208, content delivery control system 104 (see FIG. 1) maps the emotions detected in step 206 to a set of rules for the geographic area. In one embodiment, a policy engine of content delivery control system 104 (see FIG. 1) maps the emotions to local rules, local culture, the geographic areas, and sets of people related to a current situation determined by the content received in step 202 (e.g., news content).

In step 210, content delivery control system 104 (see FIG. 1) identifies unacceptable content in the stream data based on the emotions detected in step 206, the current time, and the set of rules for the geographic area, where the stream data is being received in the geographic area. Alternatively, content delivery control system 104 (see FIG. 1) identifies unacceptable content in content that is scheduled to be streamed and received in the geographic area based on the emotions detected in step 206, the time for the scheduled streaming of the content, and the set of rules for the geographic area.

In step 212, content delivery control system 104 (see FIG. 1) notifies content delivery servers in content delivery network 112 (see FIG. 1) to discard the unacceptable content identified in step 210 or defer a delivery of the unacceptable content to content distribution channels, thereby preventing a delivery of the unacceptable content to device 110 (see FIG. 1) and preventing the end user from viewing the unacceptable content. The notification of the content delivery servers in step 212 promotes social awareness, thereby enhancing goodwill for the entities that provide content via content delivery network 112 (see FIG. 1).

After step 212, the process of FIG. 2 ends at step 214.

In one embodiment, content delivery control system 104 (see FIG. 1) identifies other content in the stream data that is acceptable based on the emotions and the set of rules for the geographic area. content delivery control system 104 (see FIG. 1) notifies the content delivery servers in content delivery network 112 (see FIG. 1) to permit the identified other content to be delivered through the content distribution channels so that the identified other content is viewed by the end user.

In one embodiment, steps 204, 206, 208, 210, and 212 are performed in a service orchestration layer of a 5G network.

In one embodiment, content delivery control system 104 (see FIG. 1) collects real-time content and determines that the real-time content is news content. Content delivery control system 104 (see FIG. 1) uses a natural language classifier to determine that the news content indicates that an event is happening in a geographic area and the event is tragic. Content delivery control system 104 (see FIG. 1) determines that metadata associated with the news content and which indicates that the event is tragic does not match metadata associated with stream data from another channel and which indicates that the content in the stream data is content that is entertaining. In the embodiment described in this paragraph, identifying the unacceptable content in step 210 is performed based on the metadata associated with the news content not matching the metadata associated with the stream data.

In one embodiment, content delivery control system 104 (see FIG. 1) collects real-time content and determines that the real-time content is news content about an event. Content delivery control system 104 (see FIG. 1) monitors a cycle of the event to determine times at which the event is ongoing and other times at which the event is completed. Content delivery control system 104 (see FIG. 1) discards the unacceptable content identified in step 210 at the times at which the event is ongoing. Subsequent to discarding the unacceptable content, content delivery control system 104 (see FIG. 1) permits a delivery of the unacceptable content through content distribution channels at the other times at which the event is completed.

Computer System

FIG. 3 is a block diagram of a computer included in the system of FIG. 1 and that implements the process of FIG. 2, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for content delivery control system 104 (see FIG. 1) to perform a method of controlling content delivery, where the instructions are executed by CPU 302 via memory 304. CPU 302 may include a single processing unit or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer readable storage medium, which is described below. In one embodiment, computer data storage unit 312 is a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 314 that includes instructions that are executed by CPU 302 via memory 304 to control content delivery. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to controlling content delivery. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to control content delivery. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of controlling content delivery.

While it is understood that program code 314 for controlling content delivery may be deployed by manually loading directly in client, server and proxy computers (not shown) via loading a computer readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of controlling content delivery. In this case, the service provider can create, maintain, support, etc. a computer infrastructure that performs the process steps for one or more customers. In return, the service provider can receive payment from the customer (s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising the steps of:
   receiving, by one or more processors, stream data and metadata associated with the stream data from one or more sources, the stream data including first real-time media content from first one or more channels and second content from second one or more other channels;
   converting, by the one or more processors, the stream data into a text format;
   detecting, by the one or more processors, emotions of the converted stream data by processing, by the one or more processors, the converted stream data in an artificial intelligence (AI) system, the processing in the AI system including classifying, training, and extracting entities of the converted stream data;
   determining, by the one or more processors, that the first real-time media content is news content;
   determining, by the one or more processors and using a natural language classifier, that the news content includes a description of an ongoing event and the news content indicates that the ongoing event is tragic and the ongoing event is happening in a geographic area;
   determining, by the one or more processors, that the second content is content that is entertaining;
   determining, by the one or more processors and by using a rule, that first metadata associated with the news content that indicates that the ongoing event is tragic does not match second metadata associated with the content that is entertaining;
   determining, by the one or more processors, that the second one or more channels are delivering the content that is entertaining to the geographic area in which the ongoing event that is tragic is happening;
   in response to the determining that the content that is entertaining is being delivered by the second one or more channels to the geographic area in which the ongoing event that is tragic is happening and based on the first metadata not matching the second metadata, automatically switching, by the one or more processors, a delivery by the second one or more channels of the content that is entertaining to other content that is non-entertainment, the delivery being made to the geographic area in which the ongoing event that is tragic is happening;
   determining, by the one or more processors, a completion of the ongoing event by monitoring a cycle of the ongoing event; and
   in response to the determining the completion of the ongoing event by the monitoring the cycle of the ongoing event, switching, by the one or more processors, a delivery by the second one or more channels of the other content that is non-entertainment to the content that is entertaining.

2. The method of claim 1, further comprising the steps of:
   identifying, by the one or more processors, third content included in the stream data that is acceptable based on the emotions and a set of rules for the geographic area; and
   notifying, by the one or more processors, content delivery servers to permit the third content to be delivered through content distribution channels so that the third content is viewed by an end user.

3. The method of claim 1, further comprising the steps of:
   receiving, by the one or more processors, other stream data and other metadata associated with the other stream data from the one or more sources;
   converting, by the one or more processors, the other stream data into the text format;
   processing, by the one or more processors, the converted other stream data in the AI system to detect other emotions of the other stream data;
   mapping, by the one or more processors, the other emotions of the other stream data to a set of rules for another geographic area;
   identifying, by the one or more processors, unacceptable content in the other stream data based on the other emotions and the set of rules for the other geographic area; and
   notifying, by the one or more processors, content delivery servers to defer a delivery of the unacceptable content to content distribution channels.

4. The method of claim 1, wherein the steps of converting the stream data into the text format, detecting the emotions of the converted stream data by processing the converted stream data in the AI system, determining that the news content includes the description of the ongoing event and the news content indicates that the ongoing event is tragic and is happening in the geographic area, determining that the second content is the content that is entertaining, determining that the first metadata does not match the second metadata, determining that the second one or more channels are delivering the content that is entertaining to the geographic area, automatically switching the delivery by the second one or more channels of the content that is entertaining to the other content that is non-entertainment, determining the completion of the ongoing event by monitoring the cycle of the ongoing event, and switching the delivery by the second one or more channels of the other content that is non-entertainment to the content that is entertaining are performed in a service orchestration layer of a 5G technology.

5. The method of claim 1, wherein the step of receiving the stream data and the metadata includes capturing the news content at a head end of a content delivery network.

6. The method of claim 1, further comprising the step of:
providing at least one support service for at least one of creating, integrating, hosting, maintaining, and deploying computer readable program code in the computer, the program code being executed by a processor of the computer to implement the steps of receiving the stream data and the metadata, converting the stream data, detecting the emotions of the converted stream data by processing the converted stream data in the AI system, determining that the first real-time media content is news content, determining that the news content includes the description of the ongoing event and the news content indicates that the ongoing event is tragic and is happening in the geographic area, determining that the second content is the content that is entertaining, determining that the first metadata does not match the second metadata, determining that the second one or more channels are delivering the content that is entertaining to the geographic area, automatically switching the delivery by the second one or more channels of the content that is entertaining to the other content that is non-entertainment, determining the completion of the ongoing event by monitoring the cycle of the ongoing event, and switching the delivery by the second one or more channels of the other content that is non-entertainment to the content that is entertaining.

7. A computer program product comprising:
one or more computer readable storage media having computer readable program code collectively stored on the one or more computer readable storage media, the computer readable program code being executed by a central processing unit (CPU) of a computer system to cause the computer system to perform a method comprising the steps of:
the computer system receiving stream data and metadata associated with the stream data from one or more sources, the stream data including first real-time media content from first one or more channels and second content from second one or more channels;
the computer system converting the stream data into a text format;
the computer system detecting emotions of the converted stream data by the computer system processing the converted stream data in an artificial intelligence (AI) system, the processing in the AI system including classifying, training, and extracting entities of the converted stream data;
the computer system determining that the first real-time media content is news content;
the computer system determining, by using a natural language classifier, that the news content includes a description of an ongoing event and the news content indicates that the ongoing event is tragic and the ongoing event is happening in a geographic area;
the computer system determining that the second content is content that is entertaining;
the computer system determining, by using a rule, that first metadata associated with the news content that indicates that the ongoing event is tragic does not match second metadata associated with the content that is entertaining;
the computer system determining that the second one or more channels are delivering the content that is entertaining to the geographic area in which the ongoing event that is tragic is happening;
in response to the determining that the content that is entertaining is being delivered by the second one or more channels to the geographic area in which the ongoing event that is tragic is happening and based on the first metadata not matching the second metadata, the computer system automatically switching a delivery by the second one or more channels of the content that is entertaining to other content that is non-entertainment, the delivery being made to the geographic area in which the ongoing event that is tragic is happening;
the computer system determining a completion of the ongoing event by the computer system monitoring a cycle of the ongoing event; and
in response to the determining the completion of the ongoing event by the monitoring the cycle of the ongoing event, the computer system switching a delivery by the second one or more channels of the other content that is non-entertainment to the content that is entertaining.

8. The computer program product of claim 7, wherein the method further comprises the steps of:
the computer system identifying third content included in the stream data that is acceptable based on the emotions and a set of rules for the geographic area; and
the computer system notifying content delivery servers to permit the third content to be delivered through content distribution channels so that the third content is viewed by an end user.

9. The computer program product of claim 7, wherein the method further comprises the steps of:
the computer system receiving other stream data and other metadata associated with the other stream data from the one or more sources;
the computer system converting the other stream data into the text format;
the computer system processing the converted other stream data in the AI system to detect other emotions of the other stream data;
the computer system mapping the other emotions of the other stream data to a set of rules for another geographic area;
the computer system identifying unacceptable content in the other stream data based on the other emotions and the set of rules for the other geographic area; and
the computer system notifying content delivery servers to defer a delivery of the unacceptable content to content distribution channels.

10. The computer program product of claim 7, wherein the steps of converting the stream data into the text format, detecting the emotions of the converted stream data by processing the converted stream data in the AI system, determining that the news content includes the description of the ongoing event and the news content indicates that the ongoing event is tragic and is happening in the geographic area, determining that the second content is the content that is entertaining, determining that the first metadata does not match the second metadata, determining that the second one or more channels are delivering the content that is entertaining to the geographic area, automatically switching the delivery by the second one or more channels of the content that is entertaining to the other content that is non-entertainment determining the completion of the ongoing event by monitoring the cycle of the ongoing event, and switching the delivery by the second one or more channels of the other content that is non-entertainment to the content that is entertaining are performed in a service orchestration layer of a 5G technology.

11. A computer system comprising:
a central processing unit (CPU);
a memory coupled to the CPU; and
one or more computer readable storage media coupled to the CPU, the one or more computer readable storage media collectively containing instructions that are executed by the CPU via the memory to implement a method comprising the steps of:
the computer system receiving stream data and metadata associated with the stream data from one or more sources, the stream data including first real-time media content from first one or more channels and second content from second one or more channels;
the computer system converting the stream data into a text format;
the computer system detecting emotions of the converted stream data by the computer system processing the converted stream data in an artificial intelligence (AI) system, the processing in the AI system including classifying, training, and extracting entities of the converted stream data;
the computer system determining that the first real-time media content is news content;
the computer system determining, by using a natural language classifier, that the news content includes a description of an ongoing event and the news content indicates that the ongoing event is tragic and the ongoing event is happening in a geographic area;
the computer system determining that the second content is content that is entertaining;
the computer system determining, by using a rule, that first metadata associated with the news content that indicates that the ongoing event is tragic does not match second metadata associated with the content that is entertaining;
the computer system determining that the second one or more channels are delivering the content that is entertaining to the geographic area in which the ongoing event that is tragic is happening;
in response to the determining that the content that is entertaining is being delivered by the second one or more channels to the geographic area in which the ongoing event that is tragic is happening and based on the first metadata not matching the second metadata, the computer system automatically switching a delivery by the second one or more channels of the content that is entertaining to other content that is non-entertainment, the delivery being made to the geographic area in which the ongoing event that is tragic is happening;
the computer system determining a completion of the ongoing event by the computer system monitoring a cycle of the ongoing event; and
in response to the determining the completion of the ongoing event by the monitoring the cycle of the ongoing event, the computer system switching a delivery by the second one or more channels of the other content that is non-entertainment to the content that is entertaining.

12. The computer system of claim 11, wherein the method further comprises the steps of:
the computer system identifying third content included in the stream data that is acceptable based on the emotions and a set of rules for the geographic area; and
the computer system notifying content delivery servers to permit the third content to be delivered through content distribution channels so that the third content is viewed by an end user.

13. The computer system of claim 11, wherein the method further comprises the steps of:
the computer system receiving other stream data and other metadata associated with the other stream data from the one or more sources;
the computer system converting the other stream data into the text format;
the computer system processing the converted other stream data in the AI system to detect other emotions of the other stream data;
the computer system mapping the other emotions of the other stream data to a set of rules for another geographic area;
the computer system identifying unacceptable content in the other stream data based on the other emotions and the set of rules for the other geographic area; and
the computer system notifying content delivery servers to defer a delivery of the unacceptable content to content distribution channels.

14. The computer system of claim 11, wherein the steps of converting the stream data into the text format, detecting the emotions of the converted stream data by processing the converted stream data in the AI system, determining that the news content includes the description of the ongoing event and the news content indicates that the ongoing event is tragic and is happening in the geographic area, determining that the second content is the content that is entertaining, determining that the first metadata does not match the second metadata, determining that the second one or more channels are delivering the content that is entertaining to the geographic area, automatically switching the delivery by the second one or more channels of the content that is entertaining to the other content that is non-entertainment determining the completion of the ongoing event by monitoring the cycle of the ongoing event, and switching the delivery by the second one or more channels of the other content that is non-entertainment to the content that is entertaining are performed in a service orchestration layer of a 5G technology.

* * * * *